United States Patent
Overend et al.

(10) Patent No.: US 6,495,626 B1
(45) Date of Patent: Dec. 17, 2002

(54) PLASTISOL COMPOSITIONS WITH TWO DISSIMILAR ACRYLIC POLYMER COMPONENTS

(75) Inventors: Andrew Stuart Overend, Warrington (GB); David Henry Cooper, Crewe (GB); John Christopher Padget, Frodsham (GB)

(73) Assignee: Zeneca Limited, London (GB)

( * ) Notice: Subject to any disclaimer, the term of this patent is extended or adjusted under 35 U.S.C. 154(b) by 0 days.

(21) Appl. No.: 09/331,958
(22) PCT Filed: Dec. 31, 1996
(86) PCT No.: PCT/GB96/03246
§ 371 (c)(1), (2), (4) Date: Aug. 18, 1999
(87) PCT Pub. No.: WO98/29507
PCT Pub. Date: Jul. 9, 1998

(30) Foreign Application Priority Data

Oct. 3, 1997 (JP) ............................................. 9-287772

(51) Int. Cl.$^7$ .............................. C08L 33/06; C08J 3/18
(52) U.S. Cl. ...................... 524/515; 524/296; 524/297; 524/523; 525/227; 525/228
(58) Field of Search ................................. 525/228, 227; 524/523, 515, 296, 297

(56) References Cited

U.S. PATENT DOCUMENTS 4,199,486 A * 4/1980 Boessler et al. ........ 260/31.8 M
4,210,567 A   7/1980 Kosters ................. 260/31.8 R

FOREIGN PATENT DOCUMENTS

| DE | 2722752 | * 11/1978 | ........... 260/31.8 M |
| EP | 185267 | * 6/1986 | ................... 252/62 |
| EP | 477708 | * 4/1992 | ........... C08L/33/12 |
| GB | 2 252 267 |   8/1992 |                       |

* cited by examiner

Primary Examiner—David W. Wu
Assistant Examiner—Kelechi C. Egwim
(74) Attorney, Agent, or Firm—Pillsbury Winthrop LLP

(57) ABSTRACT

Acrylic plastisol composition comprising a plasticiser component, a plasticiser compatible acrylic polymer powder component of primary particle size ≧0.4 μm and preferably not more than 30 μm, and Tg ≧65° C., and a plasticiser incompatible polymer powder component, where both polymers are preformed, are present in the weight ratio 95:5 to 40:60, and in combination are compatibly formulated with the plasticiser component.

39 Claims, No Drawings

PLASTISOL COMPOSITIONS WITH TWO DISSIMILAR ACRYLIC POLYMER COMPONENTS

This application is the national phase of international application PCT/GB96/03246 filed Dec. 31, 1996 which designated the U.S.

The present invention relates to an acrylic polymer—containing plastisol composition.

Plastisols are well known in the art. They are understood to be non-aqueous fluid compositions ranging in viscosity from pourable liquids to heavy pastes which contain a particulate polymer (polyvinyl chloride being historically and commercially the most important example) dispersed in a non-volatile liquid organic plasticiser material which for practical utility should be compatible with the polymer. Under ordinary conditions of storage (ambient temperatures) the polymer does not dissolve to any extent in the plasticiser but on heating the plastisol composition at an appropriate evaluated temperature, after forming the plastisol into a desired shape (e.g. by moulding or coating), the plastisol composition gels to form a homogeneous coalesced mass which retains its homogenous character permanently on cooling. The presence of the plasticiser provides desirable properties to the polymer of the plastisol, particularly workability prior to gelling and flexibility after gelling. Similar types of composition are obtained with volatile organic liquid solvents, known as organosols, and the term "plastisol" herein is intended to embrace both plastisols and organosols. The plastisols may (and usually do) contain other materials, particularly inorganic or carbonaceous fillers.

Historically, polyvinyl chloride has been the prime example of the polymer to be used for plastisol compositions because of its particular suitability for this type of composition, and indeed the art of plastisol technology has been largely built up around the use of this particular polymer. Nevertheless polyvinyl chloride does have certain disadvantages, such as a tendency to be rather sensitive to light (leading to yellowing) and to release hydrogen chloride on aggressive heating (leading to corrosion effects on substrate such as metals).

Alternatives to the use of polyvinyl chloride as the particulate polymer in plastisol compositions have therefore been sought by the industry, and in particular acrylic polymers have been proposed and used for this purpose.

For example, it is disclosed in U.S. Pat. No. 4,210,567 to employ as the polymeric component for plastisols acrylic polymers based principally either on homopolymers of methyl methacrylate or copolymers of methyl methacrylate with methacrylates of aliphatic $C_2$ to $C_{10}$ (preferably $C_2$ to $C_4$) alcohols or acrylates of $C_1$ to $C_{10}$ (preferably $C_1$ to $C_4$) alcohols.

It is appreciated by those skilled in the art that the acrylic polymer should be acceptably compatible with the plasticiser used for the plastisol composition, i.e. form a homogenous gelled mass or film on heating which is stable on cooling and does not later (e.g. after 7 days storage at ambient temperature after gelling) exude liquid plasticiser, as shown by a completely dry surface. For this purpose it is known that acrylic polymers based on methyl methacrylate (the favoured monomer for this purpose) often require the presence of copolymerised units of a suitable comonomer, such as an alkyl acrylate or a higher alkyl methacrylate, depending on the type and amount of plasticiser in the final s formulation. [N.B. The formal test herein to determine whether or not a polymer is acceptably compatible with a plasticiser in a plastisol composition is as follows: for compatibility the plastisol should form a homogeneous gelled mass or film when heated at temperature(s) within the range of from 140 to 200° C. (usually ca 160° C.) for a period within the range of from 1 to 30 minutes, usually ca. 20 minutes, which on cooling to ambient temperature (which herein is considered as ranging from about 15 to 30° C., and is usually taken as ca 23° C.), does not exclude plasticiser after 28 days storage at ambient temperature as shown by a completely dry surface of the cooled mass or film].

Another problem encountered with acrylic polymer plastisols concerns their viscosity storage stability. Thus such plastisols may tend to undergo an unacceptable increase in viscosity on standing without any application of heat, and may even gel on storage at ambient temperature.

Plastisol viscosity stability can be considered as sufficient for many industrial applications if the viscosity does not increase to exceed an upper usable limit of e.g. 100 Pas after 21 days storage at ambient temperature (23° C.) and/or in an accelerated test at 30° C. does not exceed for example 100 Pas after 1 day.

Unfortunately, in many cases there is a problem in achieving both acceptable polymer/plasticiser compatibility and acceptable plastisol viscosity stability in a given acrylic polymer plastisol composition.

Thus in many cases while the acrylic polymer is compatible with the plasticiser employed, the plastisol is not viscosity stable and quickly gels even at ambient temperature. Conversely, in many other cases the acrylic polymer plastisol is viscosity stable but unfortunately the polymer is not compatible with the plasticiser being used and either will not form a gelled mass on heating, or if it does form one, after the plastisol has been gelled and cooled to ambient temperature, the plasticiser exudes from the gelled mass as a liquid.

This problem is addressed in U.S. Pat. No. 4,199,486 and is solved therein by employing a plastisol composition comprising emulsion particles of a methyl methacrylate copolymer and an organic plasticiser, the particles having a size of from 0.05 to 5 $\mu$m and having a core/shell construction, with the shell portion surrounding the core being an acrylic polymer which is compatible which the plasticiser used, and the core portion being a methyl methacrylate homo- or copolymer which is incompatible with the plasticiser used, the overall core/shell copolymer comprising >80 weight % of methyl methacrylate and having Tg$\geq$50° C.

The drawback with the solution proposed in U.S. Pat. No. 4,199,486 is that the core/shell construction must be achieved by a sequential polymerisation process, i.e. the polymerisation of the monomers for forming the shell part are polymerised in the presence of the core polymer, usually both polymerisations being carried out without isolating the product of the first polymerisation. Since the core/shell polymer particles contain both the plasticiser compatible and plasticiser incompatible polymers, this inevitably places limitations on a formulator desiring to modify the plastisol formulation for each particular application. (Furthermore, such sequential polymerisation does not in many cases provide the desired core/shell structure for the particles). By contrast, if a plastisol formulation could be made using a combination of plasticiser compatible and plasticiser incompatible polymers, both of which have been preformed, then the formulator would have the freedom to make adjustments to the compatible/incompatible polymer ratio and thus optimise the formulation for each application.

It would therefore be far more convenient if a viscosity (storage) stable plastisol based on a compatibly formulated acrylic polymer system could be derived from a combination of plasticiser compatible and plasticiser incompatible polymer components, both of which have been preformed (i.e. separately prepared prior to combination for the plastisol composition) and have not had to be combined by the formation of one polymer in the presence of the other.

Unfortunately, according to the teaching of U.S. Pat. No. 4,199,486, such an advance is not feasible because while the overall polymer system may be compatible with the plasticiser, the plastisol formed is highly unstable from a viscosity viewpoint. Thus the core/shell invention compositions of U.S. Pat. No. 4,199,486 are compared in that specification with compositions based on simple mixtures of plasticiser compatible and plasticiser incompatible polymers, having the same monomer compositions as the core and shell polymers and present in the same proportions by weight and with the plasticiser being the same (see U.S. Pat. No. 4,199,486 at column 4 Table I; Table III, Examples 4 and 4b, and 13 and 13b). In all such comparative examples it is shown in U.S. Pat. No. 4,199,486 that the resulting acrylic plastisols, while providing polymer systems which are, in simple admixture, compatible which the plasticiser, are of very poor viscosity stability and immediately thicken at 30° C.

Contrary to the teaching of U.S. Pat. No. 4,199,486, we have now discovered viscosity stable plastisols based on an acrylic polymer-based polymer system which is overall compatible with the plasticiser, even though being a combination of a preformed plasticiser compatible acrylic polymer component and a preformed plasticiser incompatible polymer component. Further still, such plastisols in some cases unexpectedly yield gelled products of improved mechanical properties (such as tensile strength and breaking strain).

According to the present invention there is provided a plastisol composition comprising:

(A) an organic plasticiser component, (B) an acrylic polymer powder component of weight average primary particle size >0.4 $\mu$m, preferably $\geq 0.5$ $\mu$m, and preferably not more than 30 $\mu$m, which is compatible with the organic plasticiser component and has been derived from an aqueous acrylic polymer dispersion(s), and the acrylic polymer component having a Tg$\geq$65° C., preferably $\geq$70° C., and (C) a polymer powder component which is incompatible with the organic plasticiser component, wherein the plasticiser compatible and plasticiser incompatible polymer components are preformed, wherein the weight ratio of the plasticiser compatible and plasticiser incompatible polymer components is within the range of from 95:5 to 40:60, and wherein the combination of plasticiser compatible and plasticiser incompatible polymer components is compatibly formulated with the organic plasticiser component in the plastisol.

As mentioned above, the invention plastisol composition as defined is (most surprisingly in view of the teaching of U.S. Pat. No. 4,199,486) viscosity stable, gives a gelled product which does not exude plasticiser on cooling, i.e. the polymer system thereof is compatible which the plasticiser, and, surprisingly provides in some cases products of improved mechanical properties.

It is to be understood of that more than one plasticiser may be used as component (A), more than one plasticiser compatible acrylic polymer may be used as component (B), and more than one plasticiser incompatible polymer may be used as component (C). However, it is often the case that only one plasticiser is used for (A), only one plasticiser compatible polymer is used for (B), and only one plasticiser incompatible polymer is used for (C); therefore, for convenience, such components will generally be described herein in such terms, although this is not to be taken as a limitation.

The acrylic polymer powder component (B) is derived from an aqueous dispersion of the acrylic polymer using an appropriate drying method to remove the aqueous carrier medium. The primary particles of the aqueous acrylic polymer dispersion will normally be of latex particle size or not much larger, and the primary particles will usually have a weight average particle size within the range of 0.4 to 10 $\mu$m, more preferably 0.5 to 2 $\mu$m. (In other words the particles in the latex, which will be the primary particles, will usually have weight average size(s) within the range of from 0.4 to 10 $\mu$m). In a particularly preferred embodiment, the weight average particle size of the primary particles of the polymer component (B) is within the range of from 0.5 to 2 $\mu$m. It is further preferred that the polymer component (B) has a particle size distribution such that the cumulative weight total of the primary particles having a size of less than 0.4 $\mu$m is not greater than 20 weight %, more preferably not greater than 10 weight %, and particularly not greater than 5 weight %. This allows a further improvement in plastisol viscosity stability.

An aqueous polymer dispersion for component (B) can be prepared by any of the following techniques: aqueous microsuspension polymerisation, aqueous emulsion polymerisation, aqueous mini-emulsion polymerisation (in rare cases, aqueous suspension polymerisation could be used if it were desired to form a dispersion with average particle size of the order of e.g. 15–30 $\mu$m, but this would be unusual) but preferably aqueous emulsion polymerisation, and especially preferably seeded aqueous emulsion polymerisation. The aqueous polymer dispersion can also in principle be prepared by the mechanical dispersion into water of an organic solvent solution of a preformed acrylic polymer (e.g. made by either dissolving an isolated polymer solid, made using any polymerisation technique, in solvent or conducting the polymerisation in a solvent to directly yield a polymer solution), optionally followed by solvent removal. Hereinafter, the term aqueous latex or emulsion will be used (for convenience) to describe an aqueous polymer dispersion of latex particle size prepared by any of the aforementioned techniques.

An acrylic polymer latex used for the preparation of component (B) may in principle be dried by any suitable method to form the polymer powder, e.g. spray drying, freeze drying, coagulation, or fluid bed drying. However spray drying is by far the most preferred method.

Spray drying is a well known drying method for polymer latices in which the latex is sprayed as droplets by an atomizer into a chamber through which a hot gas (normally air) is blown (concurrently and/or countercurrently). The dry powdery product is in the form of polymer aggregates of average particle size usually within the range 20 $\mu$m to 150 $\mu$m. The temperature of spray drying and in particular the spray drier outlet temperature is preferably such as to avoid the primary particles of the emulsion sintering together to form fused or partially fused aggregates and this is usually achieveable by ensuring that the drier outlet temperature (i.e. the temperature at which the drying gas exits the drying chamber) is not more than 15° C. above the polymer glass transition temperature Tg. While such fusion can give rise to an increase in the viscosity stability of the resulting plastisols, it can also sometimes be disadvantageous as the polymer aggregates frequently do not break down during plastisol formulation and hence the homogeneity and properties of the final gelled mass on coating are impaired. Expensive grinding processes can be needed to break down such fused aggregates. We have therefore found that it is advantageous to conduct the spray drying such that the spray drier outlet temperature is not more than 15° C. above the polymer Tg since this usually ensures that fusion of the primary particles does not occur to any appreciable extent and aggregates formed are weaker and can be broken down during subsequent formulation, and as a result plastisols formulated from such spray dried acrylic latices in the invention polymer systems readily form homogeneous gelled masses or films on heating.

Nevertheless the benefit of using an acrylic polymer latex with a weight average primary particle size ≧0.4 μm for providing component (B) is obtained irrespective of spray drier outlet temperature. However, the improvement in utilising an average primary particle size ≧0.4 μm for polymer (B) is more apparent in the situations where the spray drier outlet temperature is not more than 15° C. above the polymer Tg.

Therefore, in a preferred embodiment of the invention the acrylic polymer powder component (B) is obtained by spray drying the aqueous dispersion and the spray drier outlet temperature used is not more than 15° C. above the Tg of the acrylic polymer component, more preferably not more than 10° C. above the Tg of the acrylic polymer component. (It could of course be equal to or below the Tg of the polymer).

A further benefit of employing a drier outlet temperature which is not more than 15° C. above the Tg of the acrylic polymer component (B) in combination with the selected primary particle size as defined (≧0.4 μm) for the acrylic polymer component is that breakdown of the particle aggregates occurs readily during the formulation of the plastisol using as component (B) powder directly from the spray drier. This can eliminate the need to grind down the spray dried powder before formulation, thereby avoiding an expensive processing step.

In another embodiment of this invention, the acrylic polymer component (B) includes material produced at dryer outlet temperatures greater than 15° C. above Tg which is composed of large aggregates which do not break down during formulation of the plastisol, and is useful for blending with polymer (also for component (B)) composed of smaller aggregates which break down during formulating, being produced when the outlet temperature is not more than 15° C. above Tg, e.g. for decreasing the viscosity of subsequent plastisols.

It is preferred that the particles emerging from the dryer have a moisture content ≦1%, more preferably ≦0.8% by weight of the total particle weight.

The glass transition temperature (Tg) of the acrylic polymer component (B) must be ≧65° C., preferably ≧70° C. The preferred upper limit for Tg is 120° C., more preferably 95° C. Therefore a preferred range is 65 to 120° C., more preferably 65 to 100° C., and still more preferably 70 to 95° C. An acrylic polymer component could have more than one Tg, e.g. if being a blend of two or more compositionally different acrylic polymers. In such cases at least one Tg should be ≦65° C., and more preferably at least 50 weight % of the polymer component should be of a polymer(s) of Tg ≦65° C.; still more preferably in such an embodiment each Tg should be ≦65° C. (The preferred upper limits for Tg mentioned above would apply for each Tg in a polymer component of more than one Tg). The Tg of a polymer is that temperature in °C. at which the polymer changes from a rubbery, elastic state to a glassy, brittle state. Tg herein may be determined experimentally using inter alia differential scanning calorimetry DSC, taking the peak of the derivative curve as Tg, or by calculation from the Fox equation. Calculation of Tg by means of the Fox equation is done as follows. The Tg, in degrees Kelvin, of a copolymer having "n" copolymerised comonomers is given by the weight fractions W of each comonomer type and the Tg's of the homopolymers (in degrees Kelvin) derived from each comonomer according to the equation:

$$\frac{1}{Tg} = \frac{W_1}{Tg_1} + \frac{W_2}{Tg_2} + \ldots \frac{W_n}{Tg_n}$$

The calculated Tg in degrees Kelvin may be readily converted to °C.

A plasticiser compatible acrylic polymer powder component (B) can, in principle, be derived from an aqueous latex of any acrylic polymer provided it can be compatibly formulated with the plasticiser(s) being used to make the plastisol and has primary particle size and Tg as defined. Such an acrylic polymer will normally comprise ≧50% by weight of (meth)acrylate monomer units and can be a homopolymer or a copolymer.

Usually, however, such an acrylic polymer component will comprise a homo- or copolymer derived from a monomer charge comprising optionally (but preferably) present methyl methacrylate (preferably 0–70 wt %), and at least one monomer (preferably 30–100 wt %) selected from alkyl acrylates ($C_1$–$C_{10}$ alkyl, preferably $C_1$–$C_4$alkyl) and alkyl methacrylates ($C_2$–$C_{10}$alkyl, preferably $C_2$–$C_4$ alkyl) and optionally an olefinically unsaturated comonomer(s) other than methyl methacrylate or an alkyl acrylate or methacrylate as defined (preferably 0–48 wt %). The wt % values are those based on the total weight of monomers used for the polymerisation.

In particular, if the acrylic polymer component used comprises a methyl methacrylate copolymer as defined above (the methyl methacrylate amount not being zero) in which the alkyl (meth)acrylate (other than methyl methacrylate) includes at least isobutyl methacrylate (preferably as the sole other type of (meth)acrylate) such use provides excellent compatibility with a wide range of plasticisers while at the same time not incurring unacceptable softness and concomitant poor properties in the resulting gelled plastisol. Examples of such copolymers are described in EP-A-0539031 reference to which is incorporated herein. (It will, nevertheless be noted that the above preferred definition for the acrylic polymer component (B) could also embrace the homopolymer of isobutyl methacrylate, and such a polymer may be useful for providing component (B) in some cases).

The preferred level of methyl methacrylate used for making an acrylic polymer component (B) is from 10 to 60 (more preferably 25 to 60) weight %, the preferred level of $C_1$–$C_{10}$ alkyl acrylate/$C_2$–$C_{10}$ alkyl methacrylate is from 40 to 90 (more preferably 40 to 75) weight % and the preferred level of optional other comonomer(s) is from 0 to 40 weight % (more preferably 0 to 35%).

While it is possible in principle for an acrylic polymer component (B) to be derived only from methyl methacrylate and said alkyl (meth)acrylate(s), or said alkyl (meth)acrylate (s) alone, the monomer system used to make the acrylic polymer component does usually also include one or more other olefinically unsaturated polymerisable comonomers.

Particularly useful examples of such other comonomers are those containing adhesion promoting or crosslinkable functional groups, examples of which include acrylic and methacrylic monomers having at least one free carboxyl, hydroxyl, epoxy or amino group, such as acrylic acid and methacrylic acid (and also their amides, hydroxyalkyl esters and amino alkyl esters), glycidyl acrylate and glycidyl methacrylate; other adhesion promoting monomers include heterocyclic vinyl compounds such as vinyl pyrrolidone and vinyl imidazole. Such monomers when used are normally used in an amount of from 0.1 to 10 weight %, more usually from 0.1 to 5 weight % of the total weight of monomers used for the polymerisation.

Other types of optional comonomer(s) which may be used are those without functional groups such as those present in adhesion or crosslinking promoting monomers, examples of which include acrylonitrile, butadiene, styrene and substituted styrenes such as α-methyl styrene. Such comonomers are usually present at a level of from 0 to 25 weight % (more usually 0 to 10 weight %) of the total weight of monomers used for the polymerisation; however frequently they are not employed at all, i.e. their level is often zero.

The number average molecular weight (Mn) of the plasticiser compatible acrylic polymer component (B) will usually be within the range of from 40,000 to 2,000,000 g/mol.

Turning next to the component (C), being a polymer powder which is incompatible with the organic plasticiser component used for the composition. In principle, the plasticiser incompatible polymer component can be of any suitable polymer type, e.g. it could be an acrylonitrile homo- or copolymer, a methacrylonitrile homo -or copolymer, a styrene homo- or copolymer, a polyester, a polyurethane or a polyolefine. Most preferably, however, it is an acrylic polymer component. As defined above, such an acrylic polymer component (or non acrylic polymer component if used) is incompatible with the plasticiser component employed for the plastisol composition, i.e. if used as the sole polymer component for the plastisol, the plastisol would either not form a gelled mass on heating or if it did form a gelled mass this would exude plasticiser on ageing at ambient temperature. When formulated as defined with the plasticiser compatible particulate polymer component, however, the combination of polymer components as a whole is plasticiser compatible, and the plastisol forms a gelled mass on heating which does not exude plasticiser on ageing at ambient temperature.

The polymer powder component (C) is usually derived from an aqueous dispersion of the polymer using an appropriate drying method to remove the aqueous carrier (i.e. as per the acrylic polymer component which is plasticiser compatible—see above). [The polymer powder component (C) could also, however, be produced from routes which are not via an aqueous dispersion, for example by bulk polymerisation/grinding, nonaqueous solution polymerisation/evaporation/grinding, and nonaqueous dispersion polymerisation (radical or condensation)/drying]. The average primary particle size of an aqueous or non-aqueous dispersion (which will provide the primary particles in the dry polymer) is not as critical as with the aqueous dispersion of the plasticiser compatible acrylic polymer component and can vary more widely (although larger sized polymers can also improve viscosity stability, but not to the same extent as in the case of component B)) a preferred range being from 0.1 to 30 $\mu$m (i.e the range for the weight average primary particle size of the plasticiser incompatible polymer powder component is preferably from 0.1 to 30 $\mu$m). (In the case of ground polymer a preferred range of weight average particle size is 1 to 60 $\mu$m).

Consequently such a range could encompass suspension or bead size polymers made by aqueous suspension polymerisation (albeit needing to adjust the polymerisation conditions to achieve a preferred rather small, for aqueous suspension polymerisation, average particle size). More usually, however, the primary particles of the plasticiser incompatible polymer component will have a weight average particle size which is of latex size or not much bigger, usually within the range of from 0.4 to 10 $\mu$m, more preferably 0.5 to 2 $\mu$m.

An aqueous dispersion of a plasticiser incompatible polymer component may therefore be made by: aqueous suspension polymerisation (where largish particles are required, although the weight average particle size is preferably not more than 30 $\mu$m), and, as for as the aqueous dispersion of the plasticiser compatible polymer component, by aqueous microsuspension polymerisation, aqueous emulsion polymerisation, and aqueous mini-emulsion polymerisation, with emulsion polymerisation, and especially aqueous seeded emulsion polymerisation being preferred. Aqueous dispersions of the component polymer (C) having particles of latex size may also be made by mechanical dispersion of a preformed polymer solution into water as described above for making aqueous latices of plasticiser compatible acrylic polymer components. Again, as with the plasticiser compatible polymer dispersions, all aqueous dispersions of plasticiser incompatible polymers with particles of latex size will be described herein as polymer latices or emulsions.

An aqueous polymer dispersion used for providing the polymer component (C) may also in principle be dried by any suitable method to form the particulate material, e.g. by spray drying, freeze drying, oven drying, coagulation or fluid bed drying. However, again, spray drying is by far the most preferred method, and the discussion concerning technique and the preferred limitations regarding outlet temperature in relation to polymer Tg set out above in respect of the drying spray of an aqueous latex of the plasticiser compatible polymer component apply equally mutatis mutandis for the aqueous dispersions (usually being aqueous latices) of plasticiser incompatible polymer components.

As mentioned above the plasticiser incompatible polymer component (C) is most preferably an acrylic polymer component (as previously defined).

A plasticiser incompatible particulate polymer component (C), can in principle, be derived form an aqueous dispersion of any acrylic polymer provided this polymer is incompatible with the plasticiser component used in the plastisol (as defined) and when formulated in combination with the aforementioned plasticiser compatible particulate polymer component (B) yields a polymer combination that is then compatible with the plasticiser component. Such an incompatible acrylic polymer will usually comprise $\geq 50$ wt% by weight of (meth)acrylate monomer units and can be a homopolymer or a copolymer.

Usually, however, a plasticiser incompatible acrylic polymer component (C) will comprise a homo-or copolymer derived from a monomer charge comprising methyl methacrylate (preferably 20 to 100 wt %, more preferably 40 to 100 wt %) and optionally at least one monomer (0 to 80 wt %, more preferably 0 to 60 wt %) selected from alkyl acrylates ($C_1$–$C_{10}$alkyl, preferably $C_1$–$C_4$) and alkyl methacrylates ($C_2$–$C_{10}$alkyl, preferably $C_2$–$C_4$) and optionally an olefinically unsaturated comonomer(s) other than methyl methacrylate or an alkyl acrylate or methacrylate as defined (preferably 0–48 wt %). The wt % values are those based on the total weight of monomers used for the polymerisation.

A still more preferred level of methyl methacrylate used for making a plasticiser incompatible acrylic polymer component (C) is from 50 to 100 (still more preferably 60 to 100)

weight %, a still more preferred level of $C_1$–$C_{10}$ alkyl acrylate/$C_2$–$C_{10}$ alkyl methacrylate is from 0 to 50 (still further preferably 0 to 40) weight % and a still more preferred level of optional other comonomer(s) is from 0 to 40 weight % (still further preferably 0 to 35 weight %).

While it is possible in principle for a plasticiser incompatible acrylic polymer component (C) to be derived only from methyl methacrylate and optionally said alkyl (meth) acrylate(s), the monomer system used to make the methyl methacrylate copolymer does usually also include one or more other olefinically unsaturated polymerisable comonomers.

Particularly useful examples of such other comonomers are those containing adhesion promoting or crosslinkable functional groups, examples of which include acrylic and methacrylic monomers having at least one free carboxyl, hydroxyl, epoxy or amino group, such as acrylic acid and methacrylic acid (and also their amides, hydroxyalkyl esters and amino alkyl esters), glycidyl acrylate and glycidyl methacrylate; other adhesion promoting monomers include heterocyclic vinyl compounds such as vinyl pyrrolidone and vinyl imidazole. Such monomers when used are normally used in an amount of from 0.1 to 10 weight %, more usually from 0.1 to 5 weight % of the monomers used for the polymerisation.

Other types of optional comonomer(s) which may be used are those without functional groups such as those present in adhesion or crosslinking promoting monomers, examples of which include acrylonitrile, methacrylonitrile, butadiene, styrene and substituted styrenes such as α-methyl styrene. Such comonomers are usually present at a level of from 0 to 48 weight % (more preferably 0 to 40 weight %, still more preferably 0 to 35 weight % and particularly 0 to 25 weight %) of the monomers used for the polymerisation; however frequently they are not employed at all, i.e. their level often being zero.

Other useful polymers for providing an incompatible polymer component (C) include styrene homo- and copolymers, and acrylonitrile or methacrylonitrile homo- and copolymers (hereinafter (meth)acrylonitrile homo- and copolymers).

In the case of a styrene homo- or copolymer component, such a polymer component is usually derived from a charge comprising styrene (preferably 50 to 100 weight %); $C_1$–$C_{10}$ (preferably $C_1$–$C_4$) alkyl acrylate(s) and/or methacrylates (preferably 0 to 50 weight %); and acrylonitrile and/or methacrylonitrile (preferably 0 to 48 weight %); and also optionally other comonomer(s) containing adhesion promoting or crosslinkable functional groups, examples of which are given above in respect of acrylic copolymers suitable for component (C) (preferably 0.1 to 10 weight %, more preferably 0.1 to 5 weight %, if present).

In the case of a (meth)acrylonitrile homo- or copolymer component, such a polymer is usually derived from a momer charge comprising (meth)acrylonitrile (preferably 50 to 100 weight %); $C_1$–$C_{10}$ (preferably $C_1$–$C_4$) alkyl acrylate(s) and/or methacrylates preferably 0 to 50 weight %); and styrene (preferably 0 to 48 weight %); and also optionally other comonomer(s) containing adhesion promoting or crosslinkable functional groups, examples of which are given above in respect of acrylic copolymers suitable for component (C) (preferably 0.1 to 10 weight %, more preferably 0.1 to 5 weight %, if present).

The weight % values are, again, based on the total weight of monomers used for the polymerisation.

The weight ratio of the plasticiser compatible polymer component and plasticiser incompatible polymer component is within the range, as defined above, of from 95:5 to 0:60; preferably this range is from 90:10 to 50:50, and more preferably from 80:20 to 0:50.

As mentioned above, both the plasticiser compatible polymer component and plasticiser incompatible polymer component are preferably made in latex (or emulsion) form and so are usually made by aqueous emulsion polymerisation.

The Tg of the plasticiser incompatible polymer component (C) is not so critical as for the plasticiser compatible acrylic polymer component (B). Generally speaking, however, it will be within the range of from 50 to 120° C., and more usually 70 to 110° C.

As mentioned above, the plasticiser compatible polymer component (B) could have more than one Tg; e.g. if using a seeded emulsion polymerisation to form it, the seed Tg could be different to the main polymer Tg (although it is usually the same), in which case at least the main polymer Tg needs to be $\geq 65°$ C.; alternatively the compatible polymer component could be a blend of compositionally different polymers of different Tg, at least one Tg having Tg$\geq 65°$ C., and more preferably at least 50 weight % of the polymer component being of a polymer(s) of Tg$\geq 65°$ C., and still more preferably in such an embodiment each Tg being $\geq 65°$ C. Similarly, the plasticiser incompatible polymer component could have more than one Tg, and while Tg for the incompatible component is not so critical, each Tg is preferably within the range of 50 to 120° C.

In some instances (e.g. for customisation of the rheological behaviour of the plastisol for various end applications), it is preferred that the dried particulate product of one or both components (B) or (C) is derived from an aqueous dispersion of a polymer which has a bi-modal (i.e. 2 particle size maxima) or multi modal (i.e. more than 2 particle size maxima) particle size distribution with, in the case of component (B), an overall weight average particle size (i.e. the weight average of all the primary particles) of at least 0.4 μm, or, in the case of component (C) preferably with an overall weight average particle size (i.e. the weight average of all the primary particles) with the range 0.1 to 30 μm. (Where a latex polymer has a polymodal particle size distribution in which the polydispersities of the weight fractions corresponding to each maximum are all or near unity, then the overall weight average particle size may be calculated from the appropriately weighted size contributions corresponding to each maximum). The bi-modal or multi-modal size distribution of the latex can either be achieved by blending various weight fractions of preformed latices having the desired weight average particle size distributions or be generated in situ during the emulsion polymerisation. (Of course the admixture of components (B) and (C) may well in itself yield a particulate product which is bi- or multimodal, if they have different average particle sizes—as is likely).

The number average molecular weight Mn of the plasticiser incompatible polymer component (C) will usually be within the range of from 40,000 to 2,000,000 g/mol.

Molecular weights can be determined by gel permeation chromatography using a polymer of known Mn as a standard. For such measurement, it would be necessary for a polymer to be soluble in a solvent to carry out the Mn determination. However, the invention is not restricted to the use of plasticiser incompatible polymers for component (C) which are solvent-soluble, and such polymers can be or include solvent-insoluble chemically crosslinked polymers whose Mn is much higher than 2,000,000 or even infinite; such crosslinking can be achieved by the use of free radically polymerisable di or higher functional olefinically unsaturated comonomer(s) in the monomer systems for their production, e.g. ethylene glycol dimethacrylate, allyl methacrylate, and divinyl benzene.

It will be appreciated by those skilled in the art that various known emulsion polymerisation processes can be used to produce polymer latices from which the powdery dried polymers can be made, usually by spray drying. The simplest emulsion polymerisation process involves dispersing the monomer(s) in an aqueous medium and conducting polymerisation, with agitation (stirring), in the presence of a free-radical forming water-soluble initiator(s) which provides initiating species at an appropriate polymerisation temperature, and surfactant material(s) which assists in monomer and resulting polymer particle stabilisation. Typical initiators are persulphates such as Na, K or $NH_4$ presulphate or peroxides such as hydrogen peroxide; and typical surfactants are materials such as anionic or nonionic emulsifiers such as Na, K or ammonium salts of dialkylsulphosuccinates, Na K or ammonium salts of sulphate oils, Na, K or ammonium salts of alkyl sulphonic acids, Na, K and ammonium alkyl sulphates, $C_{22-24}$ fatty alcohols, ethoxylated fatty acids and/or fatty amides, and Na, K or ammonium salts of fatty acids such as Na stearate and Na oleate. Chain transfer agents (like alkane thiols) may be used in the polymerisation to control molecular weight. In such a batch emulsion polymerisation process it is difficult to control accurately the particle size distribution when the target weight average particle is greater than 0.3 $\mu$m.

Therefore, in order to exercise good particle size control when making an acrylic latex for component (B) with weight average particle size $\geq 0.4$ $\mu$m, a seed and monomer feed emulsion polymerisation process is preferred. The seed can either be prepared in situ or prepared externally. A preferred embodiment of this invention is where a "pre-formed" seed (i.e. one prepared externally) and monomer feed emulsion polymerisation process is used to make at least the plasticiser compatible polymer component. In this process an emulsion polymer (e.g. weight average particle diameter of 0.04 to 0.5 $\mu$m), used as the "pre-formed" seed, is grown, in one or more stages, to the desired size (weight average particle diameter of $\geq 0.4$ $\mu$m, usually 0.4 to 10 $\mu$m, in the case of component (B)) in the presence of a water soluble initiator(s) and emulsifier(s). The composition of the monomers in the feed is usually constant during the polymerisation, thus forming polymer particles with a homogeneous polymer composition. The composition of the seed could be the same or different to that of the main polymer thus providing (if different) particles with two Tg's as discussed above. (Often, however, they are of the same composition).

Preformed seeded processes can be advantageous in terms of accurately controlling the size of larger size latices required for this invention and especially for minimising the formation of particles <0.4 $\mu$m.

The resulting product is an aqueous emulsion of the polymer particles of colloidal size, and should, in the case of component (B), have an average particle size (weight average of the particle diameters) of $\geq 0.4$ $\mu$m, more preferably within the range 0.4 to 10 $\mu$m, and particularly 0.5 to 2 $\mu$m.

The level of the plasticiser component used in the plastisol composition will normally be within the range 30 to 400 parts by weight per 100 parts by weight of the polymer components (B) plus (C), more usually 50 to 200 parts by weight. Conventional filler materials can be incorporated into the plastisol composition up to 400, preferably up to 200, parts by weight, per 100 parts by weight of polymer components (B) plus (C). Other additives such as viscosity regulators (e.g. emulsifiers and silicones), volatile or non-volatile diluents, corrosion inhibitors, dyes, pigments, heat and light stabilisers, desiccants, and foaming agents (for making foamed plastigels) may also be included in the plastisol formulation if desired. In some embodiments, crosslinking agents may be included, such as multiethylenically unsaturated compounds such as di, tri or tetra(meth) acrylate compounds, epoxy resins, melamine formaldehyde resins, urea formaldehyde resins, and polyfunctional isocyanates. The use of some types of adhesion promoting monomers in the acrylic polymer, e.g. acrylic or methacrylic monomer(s) having carboxy, hydroxyl, amino or epoxy groups, may also provide the basis of crosslinkability in the polymer. Such crosslinking groups, present on both polymers, may be complementarily crosslinkable, i.e. effect crosslinking by reacting with each other; alternatively either or both polymers can contain crosslinking groups, which effect crosslinking by reacting with an added crosslinking agent.

A wide range of plasticizers made be employed, ranging from the inexpensive types such as dioctylphthalate, diisononyl phthalate, diisodecyl phthalate, dioctyl adipate, and diisodecyl adipate, to more expensive materials such as butylbenzyl phthalate, dibutoxyethyl phthalate, octylbenzyl phthalate, diisoheptyl phthalate, phosphate ester plasticizer and epoxidised soya-bean oil. Suitable fillers include chalks (calcium carbonate) which can e.g. be ground, precipitated or coated, barite, kaolin, silica (or sand), talc, bentonite, glass powder, alumina, titanium dioxide, graphite and carbon black.

The components (B) and (C) may be mixed together either prior to combining with the plasticiser component, or may be combined at the stage when mixing with the plasticiser. A combination of both techniques could also be used (e.g. portions of the components (B) and (C) could be premixed before mixing with the plasticiser and the remaining portions combined only at the stage of mixing with the plasticiser; alternatively one of the polymer components could be mixed with a combination of the plasticiser and the other polymer etc).

In the case of mixing (B) and (C) prior to combining with the plasticiser component, such admixture could be of the dry polymer powders by first separately drying aqueous dispersions of each and then mixing the resulting polymers (e.g. using a blender), or by drying a combined aqueous dispersion carrying both polymers (e.g. by co-spray drying), thereby obtaining the combination without an intervening powder mixing stage.

The plastisols of the invention find application e.g. as abrasion and corrosion inhibiting coatings for steel substrates, such as underbody antichip coatings and seam sealants for automobiles, trucks and buses. Other applications include coil coatings, flooring wear layers, sealing gaskets for caps and closures of containers (particularly in food applications), screen printing of textiles, wallpaper coatings, modelling clays, and (when used in the form of an organosol with an added volatile organic softener) as metal container (can) interior coatings.

This present invention is now further illustrated by reference to the following examples. Unless indicated to the contrary all parts, percentages and ratios are given on a weight basis. The prefix C before an example indicates that it is comparative. In the examples the following abbreviations are used.

| | |
|---|---|
| MMA | methyl methacrylate |
| i-BMA | iso-butyl methacrylate |
| n-BMA | n-butyl methacrylate |
| AA | acrylic acid |
| MAA | methacrylic acid |
| DINP | diisononylphthalate |
| OT(75) | sodium diotylsulphosuccinate (commercially available as AEROSOL OT (75), from CYTEC Industries). |

Tioxide R-TC30 titanium dioxide (Tioxide is a trademark of Imperial Chemical Industries plc).

Particle Size Analysis

The number and weight average particle sizes and polydispersities (i.e. ratio of number average/weight average particle sizes) of polymer latices (made by aqueous emulsion polymerisation) were determined using a disc centrifuge particle sizer (Brookhaven BI-DCP). Samples for size analysis were prepared by dispersing one drop of the latex in approximately 30 ml of a 80/20 weight mixture of water/methanol.

In the case of one polymer made using aqueous microsuspension polymerisation, the weight average particle size was measured by using a Coulter light scattering instrument (Coulter$^R$ LS $D_{50}$ average particle size).

Preparation of the Spray Dried Polymers

The latices were recovered as dry (moisture content less than 1 wt %) free flowing powders by spray drying using a pilot size (1.5 meter diameter) Niro spray drier. The spray drier was equipped with a spinning disc atomizer which atomized the latices into a heated inlet air stream (typically at a temperature of 170° C.). The feed rate of latex to heated air was set such that the spray dried product leaves the spray drier at the desired air outlet temperature, in the form of a dry, particulate powder consisting of aggregates of primary latex particles which have not sintered (i.e. loosely associated).

Preparation of a 0.3 μm Seed Latex SL1

3900 g of demineralised water and 66.67 g of seed latex (commercially available as NeoCryl XK 52, ZENECA Resins) were charged into a 10 liter reaction vessel equipped with a mechanical stirrer, reflux condenser, thermometer, nitrogen purge, 150 mi and 500 ml graduated funnels. The reaction mixture was heated to 80±2° C. and then 67 ml of initiator feed (A) was added; when the reaction temperature reached 80±2° C. again, the monomer feed (B) was added at a feed rate of 1000 g/hr and the initiator feed (A) was added at a rate of 70 ml/hr. When monomer feed (B) was complete the remaining initiator feed (A) was added in a single shot and the reaction temperature was maintained at 80±2° C. for 30 minutes to provide a monomer bum up stage. Finally the polymer latex was cooled to room temperature and filtered through a 50 μm sieve. The latex produced, SL1, had a solids content of 40.7 wt %, number average particle size of 0.30 μm and a weight average particle size of 0.30 μm. Its Tg was 75° C.

Initiator Feed (A)

2.67 g of potassium persulphate 330 g of demineralised water

Monomer Feed (B)

1424 g MMA 1483 g i-BMA 59.3 g M 11.27 g of OT(75)

Preparation of a 0.3 μm Seed Latex SL2

4430 g of demineralised water and 66.67 g of seed latex (commercially available as NeoCryl XK 52, ZENECA Resins) were charged into a 10 liter reaction equipped with a mechanical stirrer, reflux condenser, thermometer, nitrogen purge, 150 ml and 500 ml graduated funnels. The reaction mixture was heated to 80±2° C. and then 67 ml of initiator feed (A) was added; when the reaction temperature reached 80±2° C. again, monomer feed was added at a feed rate of 1080 g/hr and the initiator feed (A) was added at a rate of 70 ml/hr. When monomer feed (B) was complete the remaining initiator feed (A) was added in a single shot and the reaction temperature was maintained at 80±2° C. for 30 minutes to provide a monomer burn up stage. Finally the polymer latex was cooled to room temperature and filtered through a 50 μm sieve. The latex produced, SL2, had a solids content of 41.2 wt %, number average particle size of 0.28 μm and a weight average particle size of 0.29 μm. Its Tg was 99° C.

Initiator Feed (A)

2.67 g of potassium persulphate 330 g of demineralised water

Monomer Feed (B)

3267 g MMA 66.7 g AA 13.33 g of OT(75)

Compatible Polymer cP1 Preparation (via Seeded Aqueous Emulsion polymerisation)

3800 g of demineralised water and 1000 g of seed latex (SL1) were charged into a 10 liter reaction vessel equipped with a mechanical stirrer, reflux condenser, thermometer, nitrogen purge, 150 ml and 500 ml graduated funnels. The reaction mixture was heated to 80±2° C. and then 67 ml of the initiator feed (A) was added; when the reaction temperature reached 80±2° C. again, monomer feed (B) was added at the feed rate of 1000 g/hr and the initiator feed (A) was added at a rate of 70 ml/hr. When monomer feed (B) was complete the remaining initiator feed (A) was added in a single shot and the reaction temperature was maintained at 80±2° C. for 30 minutes to provide a monomer burn up stage. Finally the polymer latex was cooled to room temperature and filtered through a 50 μm sieve. The latex produced had a solids content of 40.3 wt %, number average particle size of 0.59 μm, weight average particle size of 0.59 m, polydispersity of 1.0, and cumulative weight % of particles less than 0.4 μm of less than 1 wt %. The latex was then recovered as a dry free flowing powder cP1 by spray drying at drier inlet/outlet temperatures of 170° C./80° C. respectively. Its Tg was 75° C.

Initiator Feed (A)

2.67 g of potassium persulphate 330 g of demineralised water

Monomer Feed (B)

1424 g MMA 1483 g i-BMA 59.3 g M 16.00 g OT (75)

Incompatible Polymer iP1 Preparation (via Seeded Aqueous Emulsion Polymerisation)

3730 g of demineralised water and 1000 g of seed latex (SL2) were charged into a 10 liter reaction vessel equipped with a mechanical stirrer, reflux condenser, thermometer, nitrogen purge, 150 ml and 500 ml graduated funnels. The reaction mixture was heated to 80±2° C. and then 67 ml of the initiator feed (A) was added; when the reaction temperature reached 80±2° C. again, monomer feed (B) was added at a feed rate of 1000 g/hr and the initiator feed (A) was added at a rate of 70 ml/hr. When monomer feed (B) was complete the remaining initiator feed (A) was added in a single shot and the reaction temperature was maintained at 80±9° C. for 30 minutes to provide a monomer burn up stage. Finally the polymer latex was cooled to room temperature and filtered 1through a 50 μm sieve. The latex produced had a solid content of 41.7 wt %, number average particle size of 0.58 μm, weight average particle size of 0.60 μm, polydispersity of 1.03. The latex was then recovered as a dry free flowing powder iP1 by spray drying at drier inlet/outlet temperatures of 170° C./80° C. respectively. Its Tg was 99° C.

Initiator Feed (A)
- 2.67 g of potassium persulphate
- 330 g of demineralised water Monomer Feed (B)
- 2875 g MMA
- 58.7 g M
- 11.73 g OT(75)

Compatible Polymer cP2 Preparation Made for Comparison purposes (via Seeded Aqueous Emulsion Polymerisation)

2360 g of demineralised water and 40 g of seed latex (commercially available as NeoCryl XK-52, ZENECA Resins) were charged into a 5 liter reaction vessel equipped with a mechanical stirrer, reflux condenser, thermometer, nitrogen purge, 150 ml and 500 ml graduated funnels. The reaction mixture was heated to 80±2° C. and then 100 ml of the initiator feed (A) was added; when the reaction temperature reached 80±2° C. again, monomer feed (B) was added at a feed rate of 600 ml/hr and the initiator feed (A) was added at a rate of 80 ml/hr. When monomer feed (B) was complete the remaining initiator feed (A) was added in a single shot and the reaction temperature was maintained at 80±2° C. for 30 minutes to provide a monomer burn up stage. Finally the polymer latex was cooled to room temperature and filtered through a 50 μm sieve. The latex produced had a solids content of 41.3 wt %, number average particle size of 0.30 μm, weight average particle size of 0.31 μm, polydispersity of 1.03. The latex was then recovered as a dry free flowing powder cP2 by spray drying at drier inlet/outlet temperatures of 170° C./80° C. respectively. Its Tg was 48° C.

Initiator Feed (A)
- 1.95 g of potassium persulphate
- 500 g of demineralised water Monomer Feed (B)
- 780 g MMA
- 1200 g n-BMA
- 20 g MAA
- 8.00 g OT (75)

Compatible Polymer cP3 Preparation for Comparison Purposes (via Seeded Aqueous Emulsion Polymerisation)

5378 g of demineralised water and 37.21 g of seed latex (commercially available as NeoCryl XK52, ZENECA Resins) were charged into a 10 liter reaction vessel equipped with a mechanical stirrer, reflux condenser, thermometer, nitrogen purge, 150 ml and 500 ml graduated funnels. The reaction mixture was heated to 85±2° C. and then 100 ml of initiator feed (A) was added; when the reaction temperature reached 85±2° C. again, the monomer feed (B) was added at a feed rate of 1500 ml/hr and the initiator feed (A) was added at a rate of 120 ml/hr. When monomer feed (B) was complete the remaining initiator feed (A) the remaining initiator feed (A) was added in a single shot and the reaction temperature was maintained at 85±2° C. for 30 minutes to provide a monomer burn up stage. Finally the polymer latex was cooled to room temperature and filtered through a 50 μm sieve. The latex produced had a solid content of 40.2 wt %, number average particle size of 0.37 μm and a weight average particle size of 0.37 μm. The latex was then recovered as a dry free flowing powder by spray drying at drier inlet/outlet temperatures of 180° C./80° C. respectively. Its Tg was 75° C.

Initiator Feed(A)
- 6.13 g of potassium persulphate
- 500 g of demineralised water Monomer Feed (B)
- 1952 g MMA
- 2050 g i-BMA
- 81.7 g AA
- 19.26 g OT(75)

Compatible Polymer cP4 Preparation (via Seeded Aqueous Emulsion Polymerisation)

4428 g of demineralised water and 1662 g of seed latex (SL1) where charged into a 10 liter reaction vessel equipped with a mechanical stirrer, reflux condenser, thermometer, nitrogen purge, 150 ml and 500 ml graduated funnels. The reaction mixture was heated to 85±2° C. and then 100 ml or the initiator feed (A) was added; when the reaction temperature reached 85±2° C. again, monomer feed (B) was added at a feed rate of 1500 ml/hr and the initiator feed (A) was added at a rate of 120 ml/hr. When monomer feed (B) was complete the remaining initiator feed (A) was added in a single shot and the reaction temperature was maintained at 85±2° C. for 30 minutes to provide a monomer burn up stage. Finally the polymer latex was cooled to room temperature and filtered through a 50 μm sieve. The latex produced had a solid content of 40.3 wt %, number average particle size of 0.61 μm, weight average particle size of 0.62 μm, polydispersity of 1.02 and a cumulative weight % of particles less than 0.4 μm of less than 1 w/w %. The latex was then recovered as a dry free flowing powder by spray drying at drier inlet/outlet temperatures of 170° C./80° C. respectively. Its Tg was 75° C.

Initiator Feed (A)
- 6.82 g of potassium persulphate
- 500 g of demineralised water.

Monomer Feed (B)
- 1634 g MMA
- 1705 g i-BMA
- 68.21 g M
- 19.49 g OT(75)

Compatible Polymer cP5 Preparation for Comparison Purposes (via Seeded Aqueous Emulsion Polymerisation)

4914 g of demineralised water and 831 g of seed latex (SL1) were charged into a 10 liter reaction vessel equipped with a mechanical stirrer, reflux condenser, thermometer, nitrogen purge, 150 ml and 500 ml graduated funnels. The reaction mixture was heated to 85±2° C. and then 100 ml of the initiator feed (A) was added; when the reaction temperature reached 85±2° C. again, monomer feed (B) was added at a feed rate of 1500 ml/hr and the initiator feed (A) was added at a rate of 120 ml/hr. When monomer feed (B) was complete the remaining initiator feed (A) was added in a single shot and the reaction temperature was maintained at 85±2° C. for 30 minutes to provide a monomer burn up stage. Finally the polymer latex was cooled to room temperature and filtered through a 50 μm sieve. The latex produced had a solid content of 40.3 wt %, number average particle size of 0.61 μm, weight average particle size of 0.62 μm, polydispersity of 1.02 and a cumulative weight % of particles less than 0.4 μm of less than 1 w/w %. The latex was then recovered as a dry free flowing powder by spray drying at drier inlet/outlet temperatures of 170° C./65° C. respectively. Its Tg was 64° C.

Initiator Feed (A)

7.51 g of potassium persulphate
500 g of demineralised water

Monomer Feed (B)

1803 g MMA
845 g i-BMA
1032 g n-BMA
75.11 g AA
21.46 g OT(75)

Compatible Polymer cP6 Preparation (Spray Dried Latex Blend)

A 80/20 latex blend of cP1 (wt. average particle size=0.59 μm, polydispersity=1) and SL1 (wt. average particle size =0.30 μm; polydispersity=1) was prepared by mixing 3200 g of latex produced in cP1 with 800 g of the latex produced in SL1 in a 10 liter flask at ambient temperature using a mechanical stirrer. The latex blend was then recovered as a dry free flowing powder by spray drying at drier inlet/outlet temperatures of 170° C./80° C. respectively. Since the polydispersities of both cP1 and SL1 were both unity, 20 wt. % of the primary particles were of size 0.30 μm (i.e. the cumulative weight total of the primary particles having a size of less than 0.4 μm was 20 wt. %). The overall weight average particle size of the polymer blend was (by calculation) about 0.53 μm. Its Tg was 75° C.

Incompatible Polymer iP2 Preparation (via Aqueous Microsuspension Polymerization).

A 2 liter baffled reaction vessel, equipped with a mechanical stirrer, reflux condenser, nitrogen purge and thermometer, was charged with 349.5 g of demineralised water, 78.9 g of 0.178 w/w % aqueous solution of sodium dodecylbenzene sulphonate and 304.1 g of a 10 w/w % aqueous calcium phosphate suspension (ex. Taihei Kagaky Sangyo KK—grade TCP-1OU). In a separate flask 2.005 g of 2,2'-azobisisobutyronitrile (V-65 ex. Wako Pure Chemical Industries Ltd) and 0.657 g of azoisobutyronitrile (Aldrich) were dissolved in 200 g of MMA at 23° C. This monomer/initiator mixture was then added to the reaction vessel and then the reactor contents were homogenised for 18 mins under nitrogen using a YSTRAL D-7801 homogeniser. After the homogenisation stage the mechanical stirred was started (at 200 rmp) and the reaction mixture was heated to 65° C. After 2 hours at 65° C., the temperature was increased to 75° C. and maintained for 2 hours. Then the reactor was cooled to ca. 25° C. and the product was filtered through a 106 μm sieve. The $D_{50}$ particle size of 13.5 μm (weight average particle size) was determined using a Coulter$^R$ LS (light scattering instrument). Finally, the polymer was recovered by drying the filtered dispersion in an oven at 60° C. Its Tg was 99° C.

The properties of the acrylic polymers of SL1, SL2, cP1, iP1, cP2, cP3, cP4, cP5, iP2 and cP6 are summarised in the following Table 1.

TABLE 1

| Polymer Code | Monomer composition | | | | | Copolymer glass transition temp (° C.)[a] | Weight Average particle size (μm) | Solid content (if latex) (wt %) |
|---|---|---|---|---|---|---|---|---|
| | MMA | i-BMA | n-BMA | AA | MAA | | | |
| SL1 | 48 | 50 | — | 2 | — | 75 | 0.30[b] | 40.7 |
| SL2 | 98 | — | — | 2 | — | 99 | 0.29[b] | 41.2 |
| cP1 | 48 | 50 | — | 2 | — | 75 | 0.59[b] | 40.3 |
| iP1 | 98 | — | — | 2 | — | 99 | 0.6[b] | 41.7 |
| cP2 | 39 | — | 60 | — | 1 | 48 | 0.31[b] | 41.3 |
| cP3 | 48 | 50 | — | 2 | — | 75 | 0.37[b] | 40.2 |
| cP4 | 48 | 50 | — | 2 | — | 75 | 0.49[b] | 41.2 |
| cP5 | 48 | 24.8 | 25.2 | 2 | — | 64 | 0.62[b] | 40.3 |
| iP2 | 100 | — | — | — | — | 99 | 13.5[c] | 33.1 |
| cP6 | 48 | 50 | — | 2 | — | 75 | 0.53[d] | 40.3 |

[a] calculated using the Flory-Fox equation and the homopolymer Tg's in Table 2
[b] Brookhaven wt. average particle size
[c] determined by Coulter ® LS $D_{50}$ average particle size
[d] determined by calculation from proportions of SL1 and cP1.

TABLE 2

| Homopolymer | Glass transition Temperature (° K.) | Reference |
|---|---|---|
| poly(methylmethacrylate) | 372 | Polymer Handbook 3rd Ed. |
| poly(n-butylmethacrylate) | 293 | J. Brandrup & E. H. |
| poly(methacrylic acid) | 501 | Immergut. 1989, |
| poly(acrylic acid) | 379 | John Wiley & Sons Inc. |
| poly(iso-butylmethacrylate) | 326 | Aldrich catalogue 1994–5 Cat. No. 18, 154-4 |

EXAMPLE C1, C2, 3, C4, 5, C6, 7 AND 8

(Preparation and Plastisol Viscosity Stability measurements)

Acrylic plastisol compositions corresponding to Examples C1, C2, 3, C4, 5, C6, 7 and 8 (formulation details in Table 3) were prepared by dispersing the acrylic copolymers, titanium dioxide and calcium oxide in the plasticizer using a Molteni Planimax vacuum mixer blade speed approximately 150 rpm) under vacuum for 20 minutes. The plastisols were then conditioned at room temperature (at 23° C.) for 24 hours before being evaluated.

TABLE 3

| Plastisol Example No. | Compatible Polymer Code | (g) | Incompatible Polymer Code | (g) | DINP (g) | Calcium Oxide (g) | Tioxide R-TC30 (g) |
|---|---|---|---|---|---|---|---|
| C1 | cP2 | 70 | iP1 | 30 | 100 | 5 | 5 |
| C2 | SL1 | 70 | iP1 | 30 | 100 | 5 | 5 |
| 3 | cP1 | 70 | iP1 | 30 | 100 | 5 | 5 |
| C4 | cP3 | 70 | iP1 | 30 | 100 | 5 | 5 |
| 5 | cP4 | 70 | iP1 | 30 | 100 | 5 | 5 |
| C6 | cP5 | 70 | iP1 | 30 | 100 | 5 | 5 |
| 7 | cP1 | 70 | iP2 | 30 | 100 | 5 | 5 |
| 8 | cP6 | 70 | iP1 | 30 | 100 | 5 | 5 |

A Bohlin VOR rheometer fitted with a cone and plate geometry (30 mm plate diameter and a 5° cone angle) was used to measure the 30° C. equilibrium viscosity of the plastisol at a shear rate of 1.17 s$^{-1}$. This method was used to compare the increase in 30° C. equilibrium viscosity of all examples on storage at 30° C. The viscosity stability results are given in Table 4.

TABLE 4

| Plastisol Example No. | 30° C. equilibrium viscosity (Pas) after x hrs storage at 30° C. | | | | | | |
|---|---|---|---|---|---|---|---|
| | 0$^{(e)}$ | 18 | 22 | 24 | 29 | 32 | 44 |
| C1 | gelled | | | | | | |
| C2 | >100 | gelled | | | | | |
| 3 | 47 | 41 | 44 | 49 | 92 | >100 | |
| C4 | 43 | 80 | >100 | gelled | | | |
| 5 | 35 | 51 | 56 | 63 | 98 | >100 | |
| C6 | 32 | >100 | gelled | | | | |
| 7 | 19 | 17 | 17 | 17 | 25 | 37 | >100 |
| 8 | 50 | 64 | 75 | 87 | gelled | | |

[$^{(e)}$NB initial viscosity after ageing for 24 hrs at room temperature]

To determine the tensile properties and plasticizer compatibility of the plastisols a 1 mm film of each plastisol was coated onto a sheet of waxed paper and gelled in an oven at 160° C. for 30 minutes. The tensile properties were measured using a tensometer at a crosshead speed of 50 mm/minute. If no exudation of the plasticizer from the gelled film was detected after 28 days storage at room temperature then the composition was deemed compatible. The tensile results (tensile strength and breaking strain) and compatibility results are given in Table 5.

TABLE 5

| Plastisol Example No. | Tensile properties (30° C.) | | Plasticizer Compatibility after 1 month at RT |
|---|---|---|---|
| | tensile strength (MPa) | breaking strain (%) | |
| C1 | 0.81 | 69 | compatible |
| C2 | 1.31 | 288 | compatible |
| 3 | 1.3 | 413 | compatible |
| C4 | 0.98 | 190 | compatible |
| 5 | 1.10 | 188 | compatible |
| C6 | 0.93 | 96 | compatible |
| 7 | 1.41 | 438 | compatible |
| 8 | 1.16 | 123 | compatible |

Comparative Example C1 shows that the plastisol formulated using a blend of a plasticizer compatible and plasticizer incompatible polymer, where the compatible polymer has a Tg of 48° C. (i.e. less than 65° C.) and a weight average particle size of 0.31 μm (i.e. less than 0.4 μm), had an extremely unstable viscosity on storage (Table 4, i.e. gells within 24 hours at room temperature). Comparative Example C2 shows that using a plasticizer compatible polymer which has a Tg of 75° C., (i.e. greater than 65° C.), but a weight average particle size of 0.30 μm (i.e. less than 0.40 μm) slightly improves plastisol stability compared to Example C1. However, the plastisol had an initial viscosity above 100 Pas and was very unstable (Table 4). Example 3, according to the invention, demonstrates that when the plasticizer compatible polymer has the combination of a Tg above 65° C. and a weight average particle size ≧0.4 μm, it can be formulated with a plasticizer incompatible polymer into a plastisol with an initial viscosity of <100 Pas (i.e. 47 Pas) which is stable on storage at 30° C. for at least 24 hrs (see Table 4).

Example C4 shows that when using a plasticiser compatible polymer of Tg 75° C., but weight average particle size 0.37 μm (i.e. slightly below 0.4 μm), a plastisol of improved plastisol viscosity stability was obtained compared to Examples C1 and C2 but nevertheless not stable after about 22 hours at 30° C. By comparison, the plastisol of Example 5, using a plasticiser compatible polymer of weight average particle size 0.49 μm (and Tg 75° C.) exhibited very good viscosity stability (about the same as that of Example 3).

Example C6 shows that when using a plasticiser compatible polymer of weight average particle size 0.62 μm but Tg of 64° C. (i.e. just below 65°), a plastisol of improved viscosity stability compared to Examples C1 and C2 was obtained but nevertheless not stable after 18 hours.

Example 7 demonstrates that the plasticiser incompatible polymer component of the plastisol need not be derived from a colloidal size latex, the incompatible polymer of this example having a weight average particle size of 13.5 μm (and made by aqueous microsuspension polymerisation) yet yielding a plastisol which was still viscosity stable after 32 hours at 30° C.

Example 8 shows the effect of employing a plasticiser compatible polymer having a cumulative wt. % of particles of size less than 0.4 μm of 20 w/w %. The resulting plastisol viscosity was acceptable (still stable after about 24 hours), but not as good as those of Examples 3, 5 and 7 (in which the plasticiser compatible polymer each had a cumulative wt. % of particles less than 0.4 μm of less than 1 wt %).

The results from Table 5 show that on the whole (but not in every case) the invention plastisol compositions yielded gelled films of improved tensile properties (tensile strength/breaking strain).

What is claimed is:

1. Plastisol composition comprising:
   (A) at least one organic plasticiser,
   (B) an acrylic polymer powder of weight average primary particle size >0.4 μm which is compatible with each of said at least one organic plasticiser and has been derived from an aqueous acrylic polymer dispersion(s), said acrylic polymer having a Tg<65° C., and
   (C) a polymer powder which is incompatible with each of said at least one organic plasticiser,
   wherein the plasticiser compatible polymer and plasticiser incompatible polymer are preformed,
   wherein the weight ratio of the plasticiser compatible polymer and plasticiser incompatible polymer is within the range of from 95:5 to 40:60, and
   wherein the combination of plasticiser compatible polymer and plasticiser incompatible polymer is compatibly formulated with each of the at least one organic plasticiser in the plastisol.

2. Plastisol composition according to claim 1 wherein said acrylic polymer (B) has a Tg ≧70° C.

3. Plastisol composition according to claim 1 wherein the primary particles of (B) have a weight average particle size of ≧5 μm.

4. Plastisol composition according to claim 1 wherein the primary particles of (B) have a weight average particle size of not more than 30 μm.

5. Plastisol composition according to claim 1 wherein the primary particles of (B) have a weight average particle size within the range of from 0.4 to 10 μm.

6. Plastisol composition according to claim 1 wherein the size distribution of the primary particles of (B) is such that the cumulative weight of the primary particles having a size less than 0.4 μm is not more than 20 weight %.

7. Plastisol composition according to claim 1 wherein the acrylic polymer powder (B) has been formed from the aqueous acrylic polymer dispersion(s) by spray drying.

8. Plastisol composition according to claim 1 wherein said acrylic polymer component (B) comprises a homo—or copolymer derived from a monomer charge comprising 0 to 70 wt % of methyl methacrylate, 30 to 100 wt % of at least one monomer selected $C_{1-10}$-alkyl acrylates and $C_{2-10}$ alkyl methacrylates, and 0 to 48 wt % of other olefinically unsaturated monomer(s).

9. Plastisol composition according to claim 8 wherein said acrylic polymer component (B) comprises a copolymer derived from a monomer charge comprising 10 to 60 wt % of methyl methacrylate, 40 to 90 wt % of at least one monomer selected from $C_{1-10}$ alkyl acrylates and $C_{2-10}$ alkyl methacrylates and 0 to 40 wt % of other olefinically unsaturated monomer(s).

10. Plastisol composition according to claim 8 wherein said at least one monomer selected from $C_{1-10}$ alkyl acrylates and $C_{2-10}$ alkyl methacrylate is or includes isobutyl methacrylate.

11. Plastisol composition according to claim 8 wherein said other olefinically unsaturated monomer(s) includes 0.1 to 10 wt % of acrylic or methacrylic monomer(s) having at least one free carboxyl, hydroxyl, epoxy or amino group.

12. Plastisol composition according to claim 8 wherein said other olefinically unsaturated monomer(s) includes up to 25 wt % of monomer(s) selected from acrylonitrile, butadiene, styrene and α-methyl styrene.

13. Plastisol composition according to claim 1 wherein the polymer powder (C) has a weight average primary particle size within the range of from 0.1 to 30 μm, and has been derived from an aqueous polymer dispersion(s).

14. Plastisol composition according to claim 1 wherein the polymer powder (C) has a weight average primary particle size within the range of from 0.1 to 30 μm and has been derived from an aqueous polymer dispersion(s).

15. Plastisol composition according to claim 14 wherein the polymer powder (C) has been formed from the aqueous polymer dispersion(s) by spray drying.

16. Plastisol composition according to claim 14 wherein e polymer (C) comprises an acrylic polymer(s).

17. Plastisol composition according to claim 16 wherein said acrylic polymer comprising (C) comprises a home or copolymer derived from a monomer charge comprising 20 to 100 wt % methyl methacrylate, 0 to 80 wt % of at least one monomer selected from $C_{1-10}$ alkyl acrylates and $C_{2-10}$ alkyl mathacrylates, and 0 to 48 wt % of other olefinically unsaturated monomer(s).

18. Plastisol composition according to claim 17 wherein said acrylic polymer comprising (C) comprises a horn or copolymer derived from a monomer charge comprising 50 to 100 wt% methyl methacrylate, 0 to 50 wt % of at least one monomer selected from $C_{1-10}$ alkyl acrylates and $C_{2-10}$ alkyl methacrylates. and 0 to 40 wt % of other olefinically wnsaturated monomer(s).

19. Plastisol compostion according to claim 17 wherein said other olefinically unsaturated monomer(s) includes 0.1 to 10 wt %, based on the total wt % of the monomer charge for preparing the acrylic polymer (C), of acrylic or methacrylic monomer(s) having at least one free carboxyl, hydroxyl, epoxy or amino group.

20. Plastisol composition according to claim 17 wherein said other olefinically unsaturated monomer(s) includes up to 25 wt % based on the total wt % of the monomer charge for preparing the acrylic polymer (C), of monomer(s) selected from acrylonitrile, methacrylonitrile, butadiene, styrene, and α-methyl styrene.

21. Plastisol composition according to claim 1 wherein the polymer(s) of component (C.).is selected from a styrene homo- or copolymer an acrylonitrile homo- or copolymer, and a methacrylonitrile-homo- or copolymer.

22. Plastisol composition according to claim 1 wherein the plasticiser incompatible polymer (C) has a number average molecular weight within the range of from 40,000 to 2,000,000 g·mole$^1$.

23. Plastisol composition according to claim 1 wherein one or both of the plasticiser compatible polymer and plastisol incompatible polymer has a bimodal or multimodal particle size distribution.

24. Plastisol composition according to claim 1 wherein one or both of the plasticiser compatible polymer and plastisol incompatible polymer has been made using a seeded aqueous emulsion polymerisation processes.

25. Plastisol composition according to claim 1 wherein the weight ratio of the plasticiser compatible polymer and plasticiser incompatible polymer is within the range of from 90:10 to 50:50.

26. Plastisol composition according claim 1 wherein the amount of said at least one organic plasticiser in the composition is within the range of from 30 to 400 parts by weight per 100 parts by weight of the polymer (B) plus polymer (C).

27. Plastisol composition according to claim 1 which includes up to 400 parts by weight per 100 parts of the polymer (B) plus polymer (C) of a filler material.

28. Process for the preparation of a plastisol composition according to claim 1, which process comprises the admixture of components (A), (B) and (C), wherein tie polymer (B) and the polymer (C) are mixed prior to combining with the at least one plasticiser (A), or are mixed at the stage when mixing with the at least one plasticiser, or a combination of both techniques is used.

29. The method which comprises applying an acrylic polymer plastisol composition according to claim 1 to a substrate for the provision of abrasion and corrosion inhibiting coatings for steel substrates, for the provision of coil coatings, for the provision of flooring wear layers, for the provision of sealing gaskets for caps and closures of containers, for screen printing of textiles, for wallpaper coatings, for modelling clays, or for the provision of interior coatings of metal containers.

30. A plasticised product made from a plastisol composition according to claim 1.

31. Plastisol composition according to claim 5 wherein the primary particles of polymer (B) have a weight average particle size within the range of from 0.5 to 2 μm.

32. Plastisol composition according to claim 7 wherein the spray drying comprises employing a drier outlet temperature which is not more than 15° C. above the Tg of the acrylic polymer.

33. Plastisol composition according to claim 11 wherein said other olefinically unsaturated monomer is selected from the group consisting of at least one of acrylic acid and methacrylic acid (and amides, hydroxyalkyl esters, and aminoalkyl esters thereof), glycidyl acrylate and glycidyl methacrylate.

34. Plastisol composition according to claim 14 wherein the weight average primary particle size of the polymer powder (C) is within the range of of 0.5 to 2 μm.

35. Plastisol composition according to claim 15 wherein the spray drying comprises employing a drier outlet temperature which is not more than 15° C. above the Tg of the acrylic polymer.

36. Plastisol composition according to claim 19 wherein said other olefinically unsaturated monomer is selected from the group consisting of at least one of acrylic acid and methacrylic acid (and amides, hydroxyalkyl esters, and aminoalkyl esters thereof), glycidyl acrylate and glycidyl methacrylate.

37. Plastisol composition according to claim 25 wherein said weight ratio is within the range of from 80:20 to 50:50.

38. Plastisol composition according to claim 26 wherein the amount of said at least one organic plasticiser is from 50 to 200 parts by weight per 100 parts by weight of components (B) plus (C).

39. A plasticised product according to claim 30 in the form of an abrasion and corrosion inhibiting coating for a steel substrate, a coil coating, a sealing gasket for a container cap or closure, a flooring wear layer, or an interior coating of a metal container.

* * * * *

UNITED STATES PATENT AND TRADEMARK OFFICE
CERTIFICATE OF CORRECTION

PATENT NO.      : 6,495,626 B1
DATED           : December 17, 2002
INVENTOR(S)     : Andrew S. Overend et al.

Page 1 of 1

It is certified that error appears in the above-identified patent and that said Letters Patent is hereby corrected as shown below:

<u>Title page,</u>
Item [30], Foreign Application Priority Data, please delete the existing priority reference to "Japanese Application No. 9-287772" in that no priority application has been claimed for this invention.

Signed and Sealed this

Sixth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,495,626 B1
DATED : December 17, 2002
INVENTOR(S) : Andrew S. Overend et al.

It is certified that error appears in the above-identified patent and that said Letters Patent is hereby corrected as shown below:

Column 3,
Line 41, delete ">0.4 µm" and insert -- $\geq$ 0.4 µm --.

Column 5,
Lines 61, 63 and 65, delete "$\leq$ 65º C" and insert -- $\geq$ 65º C --.

Column 10,
Line 1, delete "0 : 60" and insert -- 40 : 60 --.
Line 3, delete "0 : 50" and insert -- 50 : 50 --.

Column 15,
Line 6, delete "80 ± 9" and insert -- 80 ± 2 --.
Line 8, delete "filtered 1 through" and insert -- filtered through --.
Line 21, delete "M" and insert -- AA --.

Column 16,
Line 50, delete "M" and insert -- AA --.

Column 20,
Line 51, delete ">0.4 µm" and insert -- $\geq$ 0.4 µm --.
Line 56, delete "$\leq$ 65º C" and insert -- $\geq$ 65º C --.

Column 21,
Line 5, delete "$\geq$ 5µm" and insert -- $\geq$ 0.5 µm --.
Line 6, delete "(C)" and insert -- (B) --.
Line 57, delete "e polymer" and insert -- the polymer --.
Line 59, delete "home" and insert -- homo- --.
Line 63, delete "mathacrylate" and insert -- methacrylate --.
Line 66, delete "horn" and insert -- homo- --.

UNITED STATES PATENT AND TRADEMARK OFFICE
CERTIFICATE OF CORRECTION

PATENT NO.    : 6,495,626 B1
DATED         : December 17, 2002
INVENTOR(S)   : Andrew S. Overend et al.

It is certified that error appears in the above-identified patent and that said Letters Patent is hereby corrected as shown below:

Column 22,
Line 4, delete "wnsaturated" and insert -- unsaturated --.
Line 45, delete "tie" and insert -- the --.

Signed and Sealed this

Second Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,495,626 B1
DATED : December 17, 2002
INVENTOR(S) : Overend et al.

It is certified that error appears in the above-identified patent and that said Letters Patent is hereby corrected as shown below:

Column 13,
Line 66, please delete "M" and insert -- AA --; and

Column 14,
Line 58, please delete "M" and insert -- AA --.

Column 21,
Line 7, please delete "(B)" and insert -- (C) --; and
Line 46, please delete "(C)" and insert -- (B) --.

Signed and Sealed this

Eighteenth Day of May, 2004

JON W. DUDAS
*Acting Director of the United States Patent and Trademark Office*